United States Patent
Sela et al.

(10) Patent No.: US 12,124,377 B2
(45) Date of Patent: Oct. 22, 2024

(54) DATA STORAGE DEVICE AND METHOD FOR HANDLING WRITE COMMANDS IN ZONED STORAGE

(71) Applicant: Western Digital Technologies, Inc., San Jose, CA (US)

(72) Inventors: Rotem Sela, Haifa (IL); Hadas Oshinsky, Kfar Saba (IL); Einav Zilberstein, Had Hasharon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/222,034

(22) Filed: Jul. 14, 2023

(65) Prior Publication Data

US 2024/0143509 A1    May 2, 2024

Related U.S. Application Data

(60) Provisional application No. 63/419,411, filed on Oct. 26, 2022.

(51) Int. Cl.
| | | |
|---|---|---|
| G06F 12/00 | (2006.01) | |
| G06F 3/06 | (2006.01) | |
| G06F 12/02 | (2006.01) | |
| G06F 12/0873 | (2016.01) | |
| G06F 12/123 | (2016.01) | |

(52) U.S. Cl.
CPC ........ *G06F 12/0873* (2013.01); *G06F 3/0604* (2013.01); *G06F 3/0644* (2013.01); *G06F 3/0679* (2013.01); *G06F 12/0253* (2013.01); *G06F 12/123* (2013.01)

(58) Field of Classification Search
CPC ............. G06F 12/0873; G06F 12/0253; G06F 12/123; G06F 2212/7201; G06F 3/0638; G06F 3/0604; G06F 3/0644; G06F 3/0679; G06F 3/0658
See application file for complete search history.

(56) References Cited

U.S. PATENT DOCUMENTS

| | | | |
|---|---|---|---|
| 10,095,433 B1* | 10/2018 | Gao | G06F 3/0659 |
| 2019/0012099 A1* | 1/2019 | Mulani | G06F 3/0619 |
| 2019/0114255 A1* | 4/2019 | Jain | G06F 3/068 |
| 2022/0276789 A1* | 9/2022 | Bert | G06F 3/0683 |
| 2022/0308780 A1* | 9/2022 | Kanteti | G06F 3/0679 |
| 2022/0326866 A1* | 10/2022 | Mujoo | G06F 3/061 |
| 2023/0046402 A1* | 2/2023 | Tan | G06F 3/0625 |
| 2023/0161500 A1* | 5/2023 | Doucette | G06F 3/0688 711/5 |
| 2023/0367710 A1* | 11/2023 | Porzio | G06F 12/0607 |
| 2024/0094903 A1* | 3/2024 | Kavirayani | G06F 3/0631 |
| 2024/0111456 A1* | 4/2024 | Chen | G06F 3/0673 |

* cited by examiner

*Primary Examiner* — John A Lane
(74) *Attorney, Agent, or Firm* — Crowell & Moring LLP

(57) ABSTRACT

Zoned memory typically requires write commands to be sent from a host to a data storage device in logical block address (LBA) sequential order. Instead of rejecting out-of-order write commands, the data storage device can execute those commands and internally deal with the out-of-order problem. For example, the data storage device can use a special zone logical-to-physical address table, use a temporary zone data buffer, and/or store a data's LBA in a header for later matching.

20 Claims, 8 Drawing Sheets

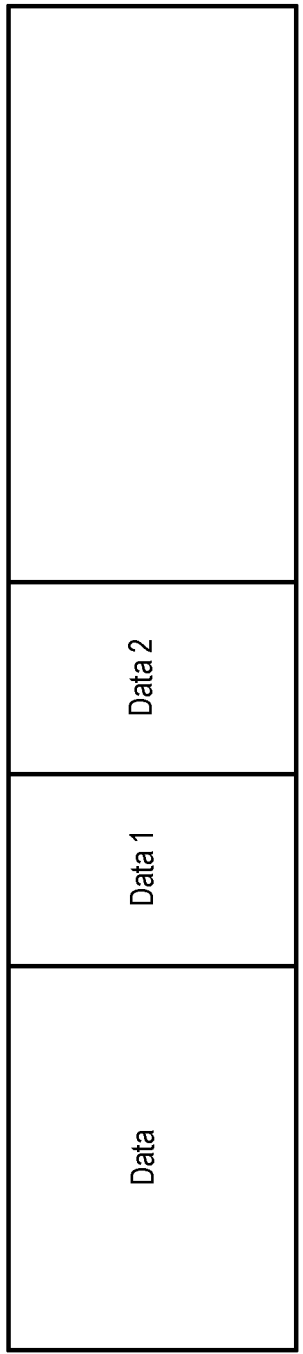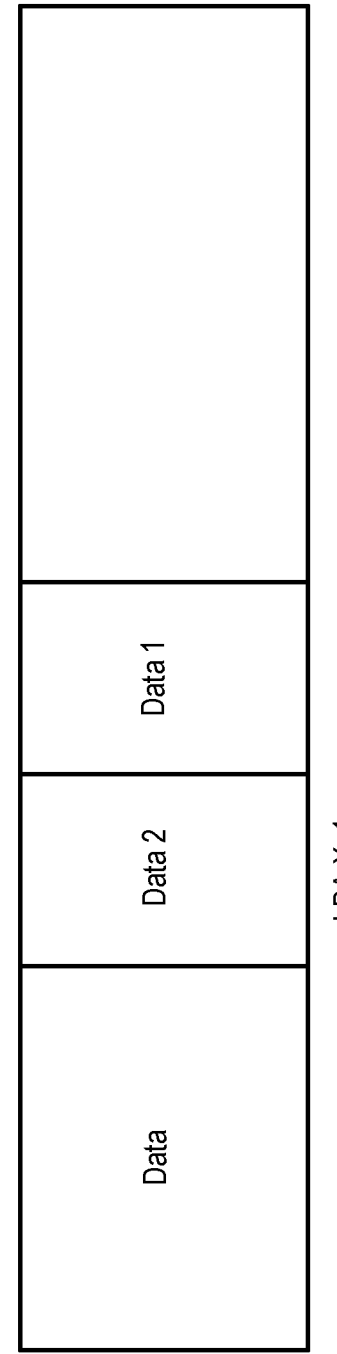

DATA STORAGE DEVICE AND METHOD FOR HANDLING WRITE COMMANDS IN ZONED STORAGE

CROSS-REFERENCE TO RELATED APPLICATION

This application claims priority to U.S. provisional patent application No. 63/419,411, filed Oct. 26, 2022, which is hereby incorporated by reference.

BACKGROUND

A host can write data to and read data from a memory in a data storage device. Some hosts and data storage devices operate under the Non-Volatile Memory Express (NVMe), Universal Flash Storage (UFS), or Zoned Block Commands (ZBC) standards. One feature of at least some of these standards is the use of a zoned namespace. In a zoned namespace, different areas of the memory are grouped into zones, where each zone is written in sequential logical block address order. Also, certain functionality of the zone can be split between the host and the data storage device.

BRIEF DESCRIPTION OF THE DRAWINGS

FIG. 4 is an illustration of a sequence of write commands of an embodiment that arrive in an expected order from a host.

FIG. 5 is an illustration of a sequence of write commands of an embodiment that arrive out-of-order from a host.

DETAILED DESCRIPTION

The following embodiments generally relate to a data storage device and method for handling write commands in zoned storage. In one embodiment, a data storage device is provided comprising a memory and a controller. The controller is configured to receive, from a host, a write command comprising data and a logical block address in a zone of the memory; determine that the logical block address does not match an expected logical block address; and in response to determining that the logical block address does not match the expected logical block address: write the data to a physical address in the zone of the memory, wherein the data is stored out-of-order with respect to other data stored in the zone of the memory; and maintain a logical-to-physical address map for the zone that maps the logical block address to the physical address.

In another embodiment, a method is provided that is performed in a data storage device comprising a non-volatile memory. The method comprises receiving, from a host, a write command comprising data and a logical block address in a zone of the non-volatile memory; determining that the logical block address does not match an expected logical block address; and in response to determining that the logical block address does not match the expected logical block address: writing the data in a temporary buffer; creating a logical-to-physical address map that maps the logical block address to a physical address in the non-volatile memory; and using the logical-to-physical address map to copy the data from the temporary buffer to the physical address in the non-volatile memory.

In yet another embodiment, a data storage device is provided comprising: a memory; means for storing, in a zone of the memory, data and a logical block address of the data, wherein the logical block address is stored in a header of the data; means for reading the data from the zone of the memory in response to receiving a read command comprising a requested logical block address; and means for finding, in the memory, data that corresponds to the requested logical block address in the read command in response to determining that the logical block address read from the zone of the memory does not match the requested logical block address in the read command. Other embodiments are provided and can be used alone or in combination.

Figure 1A:
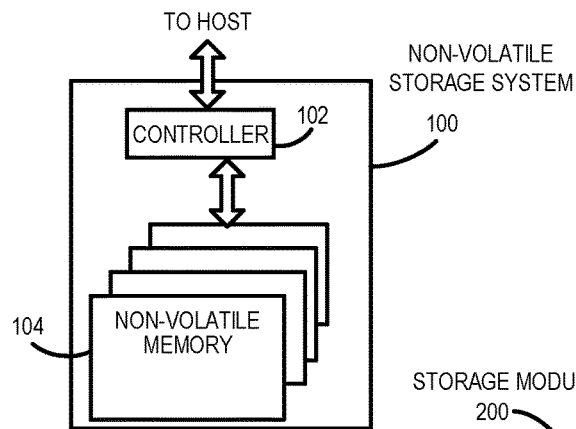
FIG. 1A is a block diagram of a non-volatile storage system of an embodiment.
Figure 1B:
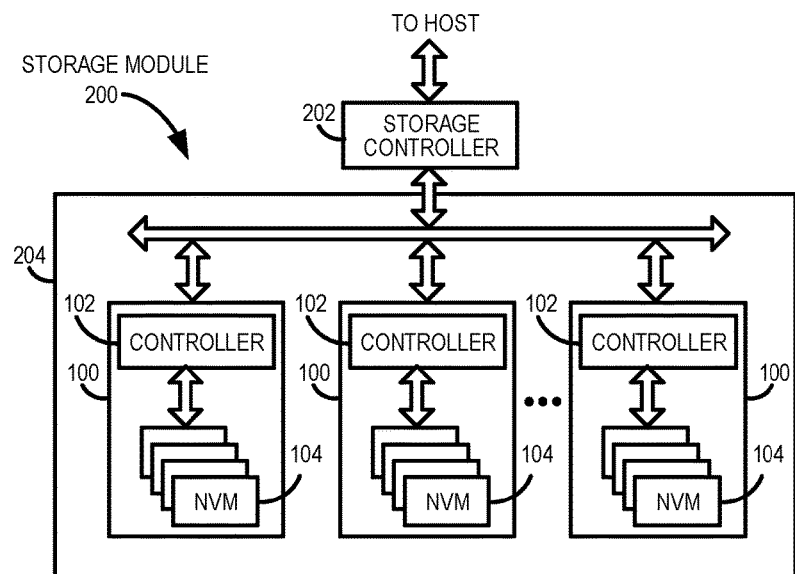
FIG. 1B is a block diagram illustrating a storage module of an embodiment.
Figure 1C:
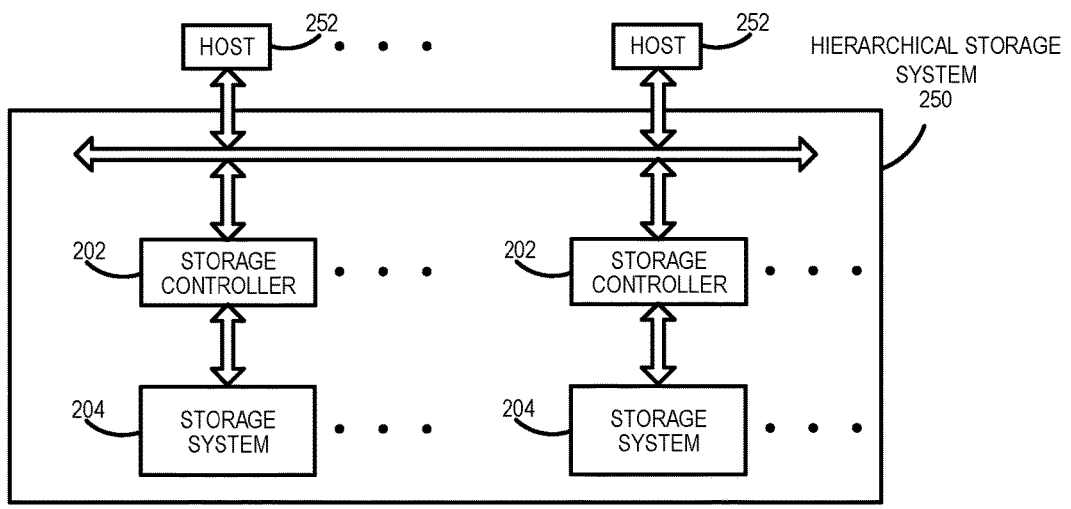
FIG. 1C is a block diagram illustrating a hierarchical storage system of an embodiment.

Turning now to the drawings, storage systems suitable for use in implementing aspects of these embodiments are shown in FIGS. 1A-1C. A storage system is sometimes referred to herein as a data storage device (DSD), which refers to a device that stores data (e.g., hard disk drives (HDDs), solid state drives (SSDs), tape drives, hybrid drives, etc.). FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as UFS (Universal Flash Storage), a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
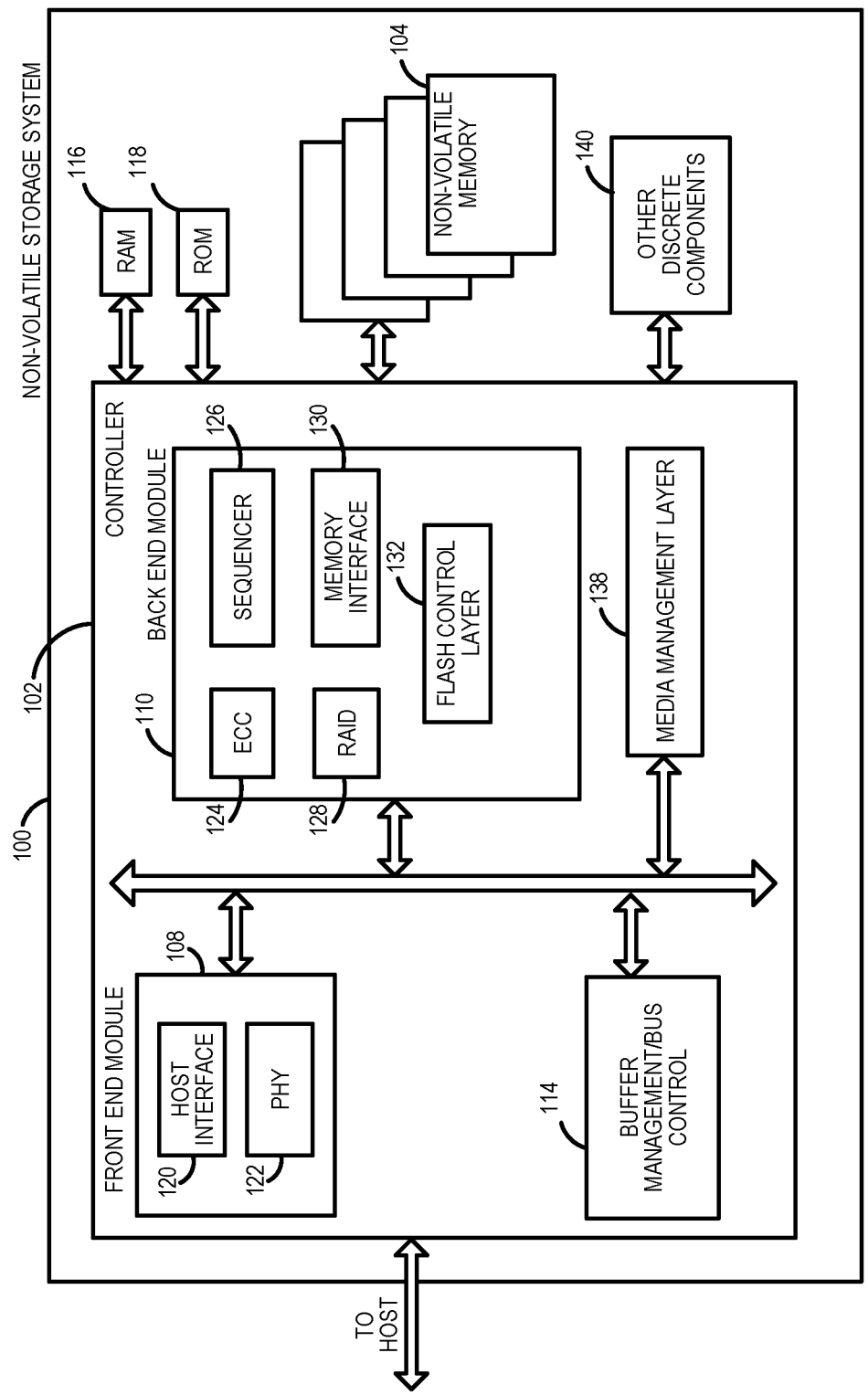
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
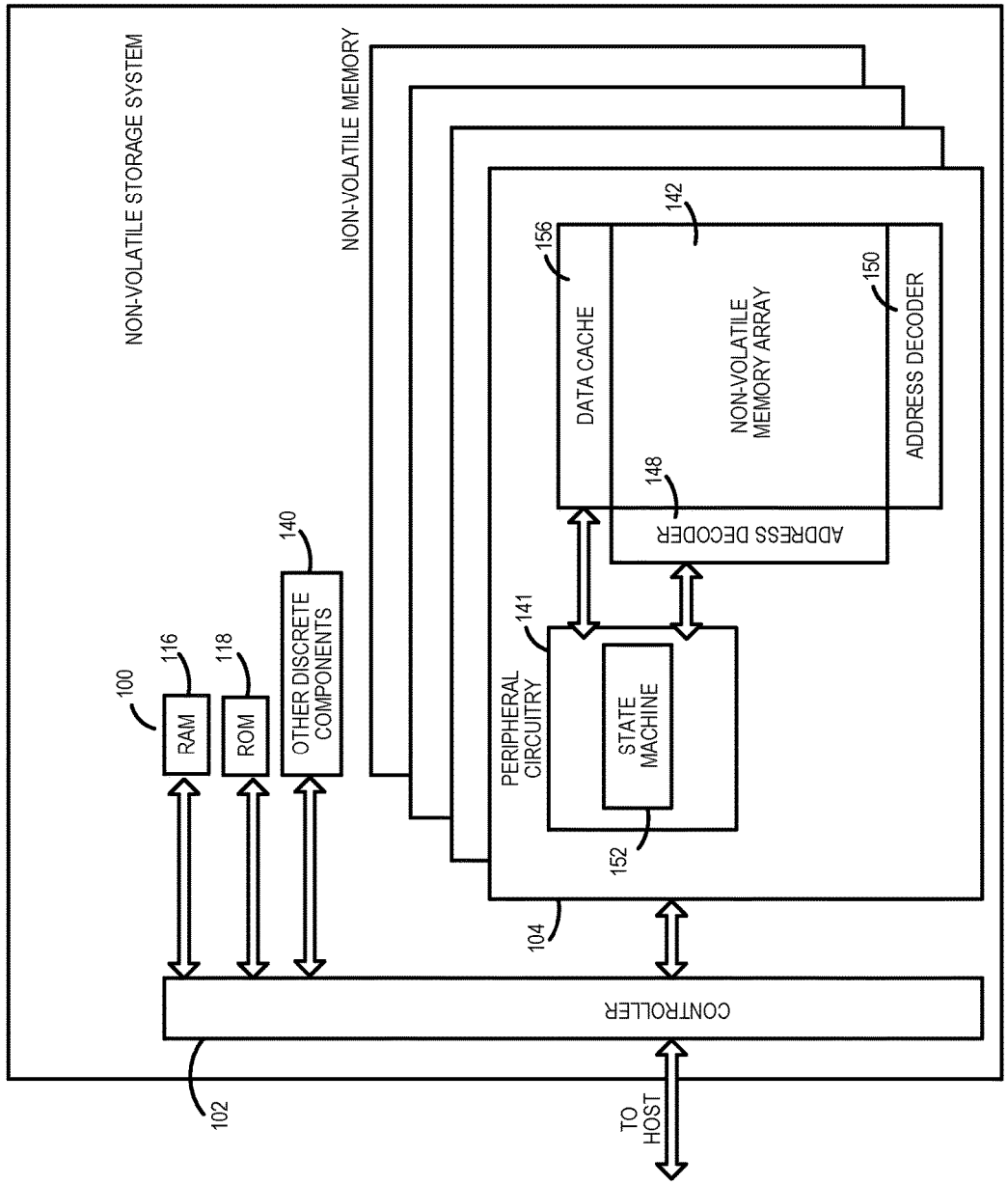
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
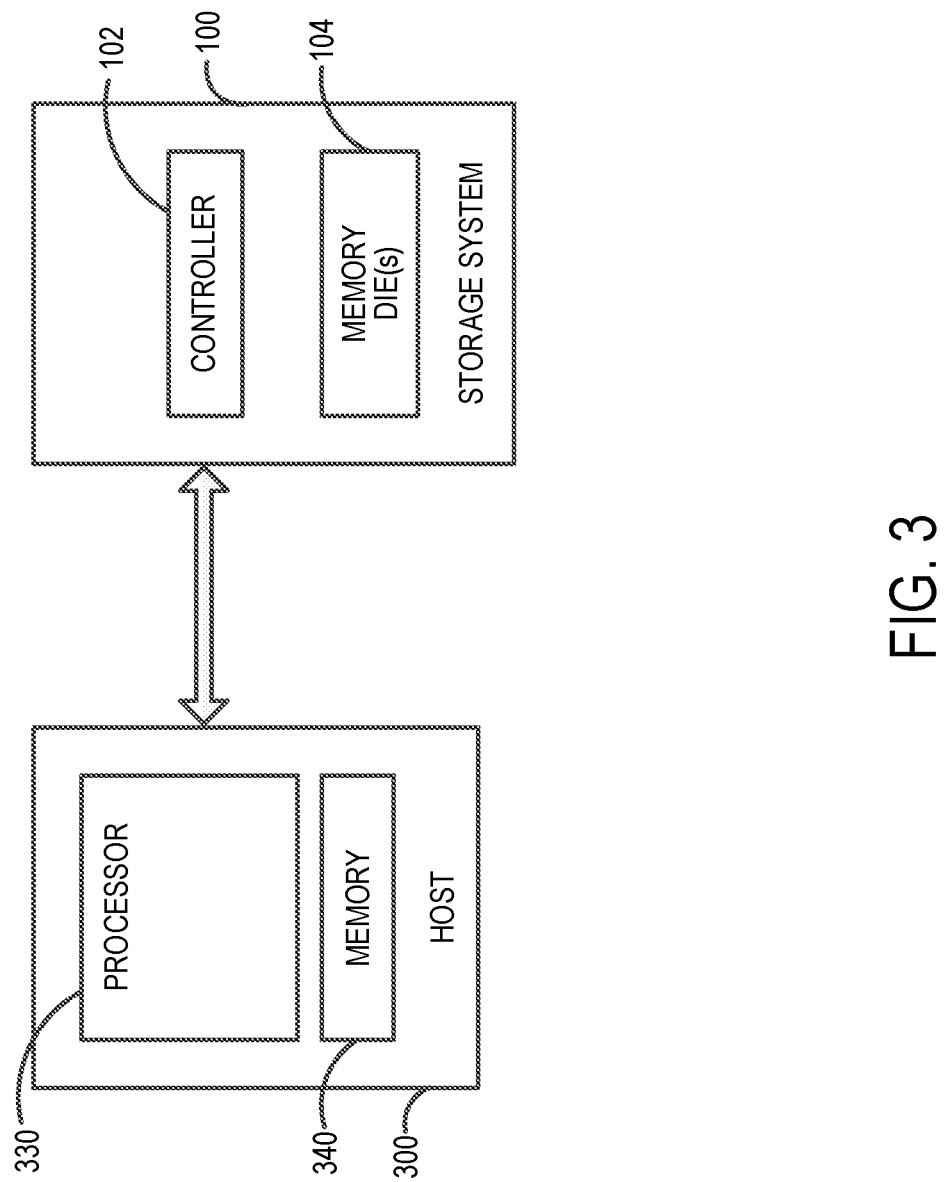
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, hosts and data storage devices can operate under the Non-Volatile Memory Express (NVMe), Universal Flash Storage (UFS), or Zoned Block Commands (ZBC) standards. One feature of some of these standards is the use of a zoned namespace, which can provide the advantage of reducing write amplification, overprovisioning, and internal controller memory usage, while improving throughput and latency. In a zoned namespace, different areas of the memory are grouped into zones, where each zone is written in sequential logical block address (LBA) order. In operation, when the data storage device 100 receives a write command from the host 300 to a zone, the controller 102 can check to make sure that the LBA in the write command matches the LBA pointed to by a write pointer maintained by the controller 102 to keep track of the position of the next write. If the LBAs match, the write can proceed. However, if the LBAs do not match, the controller 102 can provide an error message to the host 300.

A zone can have other requirements and restrictions. For example, a write command may not be able to cross into another zone when the zones are designated as sequential-required zones. As another example, a zone can be restricted from being directly overwritten, requiring the entire zone to be erased. Further, certain management of the zone can be split between the host 300 and the data storage device 100. For example, the host 300 can be responsible for aligning its writes to the sequential write requirement of the zone and managing garbage collection.

FIG. 4 shows a sequence of write commands that arrive in an expected order from the host 300. That is, the write commands are in sequential LBA order: the first write command is to write Data 1 in LBA X, and the second write command is to write Data 2 in LBA X+1. However, the sequential write requirement is not always possible for the host 300, especially when the host 300 wants to operate using a queue depth greater than one (in non-blocking mode). This is shown in FIG. 5, where the write commands are out of order: the first write command is to write Data 2 in LBA X+1, and the second write command is to write Data 1 in LBA X.

In this situation, the data storage device 100 would normally return an error in response to the presence of non-sequential write commands and avoid writing the data non-sequentially in a sequential-required zone. However, this can add latency to the write commands due to the additional validation. The data storage device 100 can also write the data in a sequential-preferred zone instead of a sequential-required zone, but this may impact performance as data was still not written sequentially. Another approach is for the host 300 to use a queue depth of one, but that has the disadvantage of performance. Yet another approach is to use a write append command, but that can be very complicated for the host 300 and the data storage device 100 to handle. The data storage device 100 can also maintain a full logical-to-physical address map (e.g., in a data structure, such as a table) for the entire logical unit number (LUN)/ storage in case of a sequential-preferred zone; however, that also has disadvantages.

The following embodiments can be used to manage situations in which write command parameters are not in accordance with zone rules (e.g., not sequential LBAs, writes across zones, etc.) while avoiding the problems noted above with other approaches. In general, these embodiments allow the host 300 to send multiple commands (e.g., a queue depth greater than one) without using a write append command and without the data storage device 100 returning an error message when the host 300 does not maintain the expected LBA order of the write commands. That is, with these embodiments, the data storage device 100 can accept a write command and not fail it even when the host 300 sends a write command with an LBA that does not match the write pointer in the data storage device 100. Further, these embodiments can still serve future read commands for that LBA without mismatch.

In one embodiment, when the host 300 provides a write command in the wrong order (e.g., to LBA X+1 instead of to LBA X), the controller 102 in the data storage device 100 identifies this situation and, instead of returning an error messages, can return a response to the host 300 indicating that the write command was successfully received and will be processed. The controller 102 then deals with the out-of-order problem internally. In this example, the controller 102 writes Data 2 of the LBA X+1 write command in the next available physical location in the memory 104 (e.g., Physical Block 1) and then writes Data 1 of the LBA X write command in the next physical location in the memory 104 (e.g., Physical Block 2). However, because the data is stored out of order in the memory 104 (i.e., Data 2 is stored before Data 1), reading the memory 104 sequentially will read out the data in the wrong order.

To address this situation, the controller 102 can create a special logical-to-physical address map for the zone that maps the logical addresses of the zone to the various physical addresses in the memory 104. (It should be noted that, in this example, the special zone map is just for the zone and is different from the regular logical-to-physical address map that is used to translate addresses in other zones or in the memory 104 overall.) That zone map would show that Data 1 and Data 2 are stored in non-sequential physical addresses in the memory 104 (e.g., Data 1 is stored in Physical Block 2, and Data 2 is stored in Physical Block 1). When the data storage device 100 later receives read commands for that zone from the host 300, the controller 102 can consult the zone map to determine the order in which to read the data out of the memory 104. So, in this example, when the controller 102 receives read commands for LBA X and LBA X+1, the zone map would tell the controller 102 to read Physical Block 2 before Physical Block 1.

In another embodiment, the controller 102 of the data storage device 100 allocates a temporary buffer for storing data from non-sequential write commands for a zone (i.e., for data from the zone's "out of order" write commands). The temporary buffer can take any suitable form. For example, the temporary buffer can be part of a volatile memory of the data storage device 100, part of a host memory buffer in the host 300, and/or part of the non-volatile memory 104 (e.g., in single-level cell (SLC) or multi-level cell (MLC) blocks in the memory 104). The temporary buffer can be used to temporarily store data from out-of-order commands from all zones or a subset (one or more) of zones.

When an out-of-order command arrives (e.g., a write command for LBA X+1, where LBA X was expected), the controller 102 in the data storage device 100 can write the data for LBA X+1 in the temporary buffer. Later, after the host 300 receives the write command for LBA X and writes the data to the zone in the memory 104, the controller 102 can copy the data from LBA X+1 from the temporary buffer and write it to the next subsequent physical address in the zone. To do this, the controller 102 can maintain a logical-to-physical address map that translates the LBAs in the temporary buffer to the physical addresses in the memory 104 where the data should eventually reside. This map can be relatively small as it is just for the temporary buffer and not for the entire zone (unlike the zone map described above in the previously embodiment).

Figure 6:
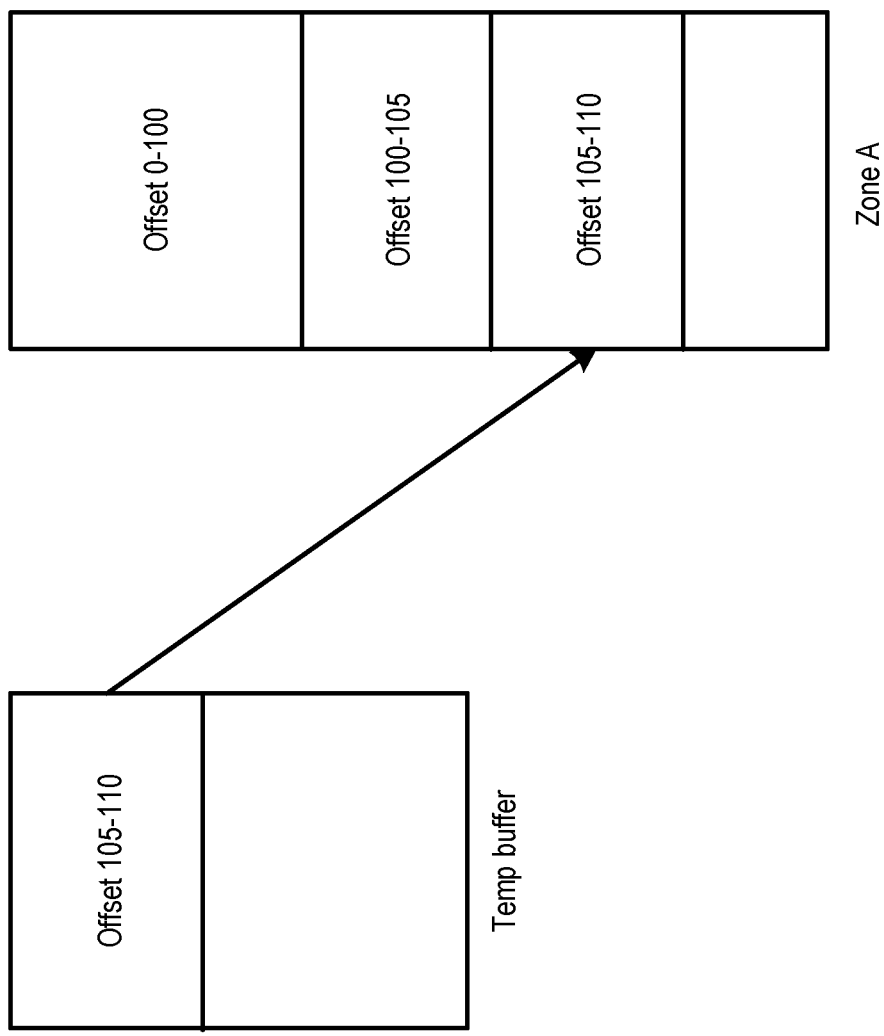
FIG. 6 is an illustration of an embodiment in which a temporary buffer is used to store data from an out-of-order write command.
Figure 7:
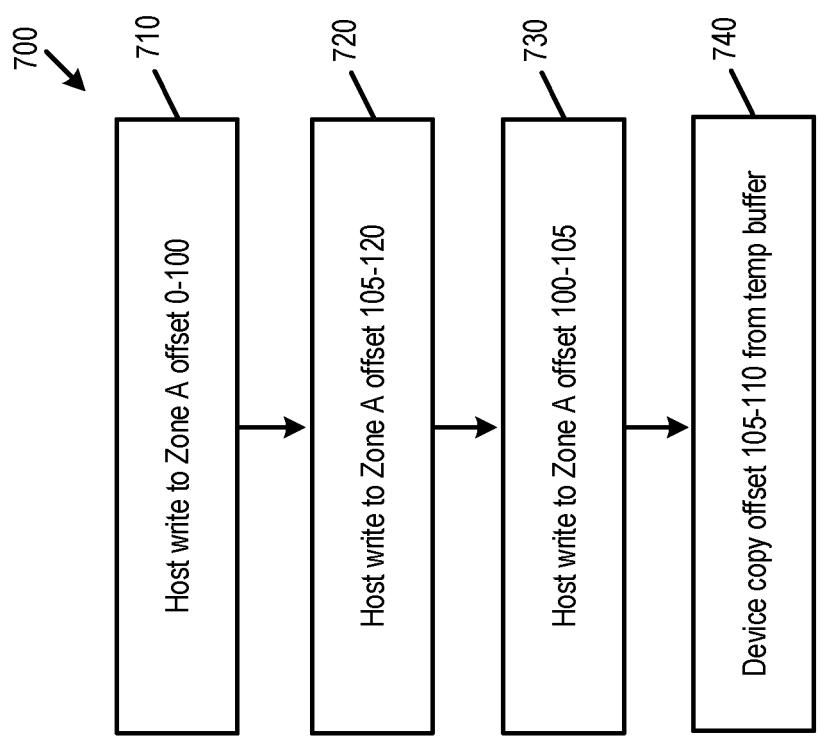
FIG. 7 is a flow chart of a method of an embodiment for handling write commands in zoned storage.

An example of this embodiment will now be illustrated in conjunction with FIG. 6 and the flow chart 700 of FIG. 7. In this example, the host 300 first writes to Zone A, offset 0-100 (act 710). Then, the host 300 writes to Zone A, offset 105-110 (act 720). This is a non-sequential address (i.e., offset 100-105 was expected), so the controller 102 stores the data for offset 105-110 in the temporary buffer. Next, the host 300 writes to Zone A, offset 100-105 (act 730), and the controller 102 write that data in the next sequential physical address in the zone. Finally, the controller 102 copies the data for offset 105-110 from the temporary buffer to the memory 104 (act 740).

Figure 8:
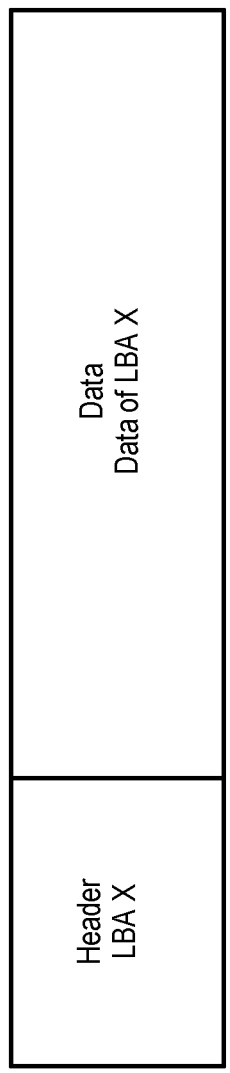
FIG. 8 is an illustration of a syntax of an embodiment comprising a header and data.

In yet another embodiment, the controller 102 (e.g., using a hardware module, validates that the read LBA indeed matches the LBA requested in a read command. In one example implementation, the controller 102 stores the LBA of each data unit of the memory 104 in the header of the data, as shown in FIG. 8. In this embodiment, the controller 102 (e.g., using a hardware engine) can ensures that when the host 300 reads a certain LBA, the LBA in the header is indeed the requested LBA. If the LBA in the header does not match the requested LBA, an error can be generated, and the data will not be transmitted back to the host 300.

In this embodiment, the controller 102 writes the data of a write command in the zone even if the write command is an out-of-order write command. The controller 102 assumes that data is written sequentially in the zone for its mapping table. When the host 300 later reads the data from the zone, the controller 102 returns the data to the host 300 if the zone was written only in ordered write commands. However, if the zone was written with data from out-of-order write commands, the LBA that was written out of order will be read, and the matching will fail as the data is not in the right order. In this case, the controller 102 can search for the right data in the zone (e.g., looking at the LBAs in headers) and read the right data instead.

Figure 9:
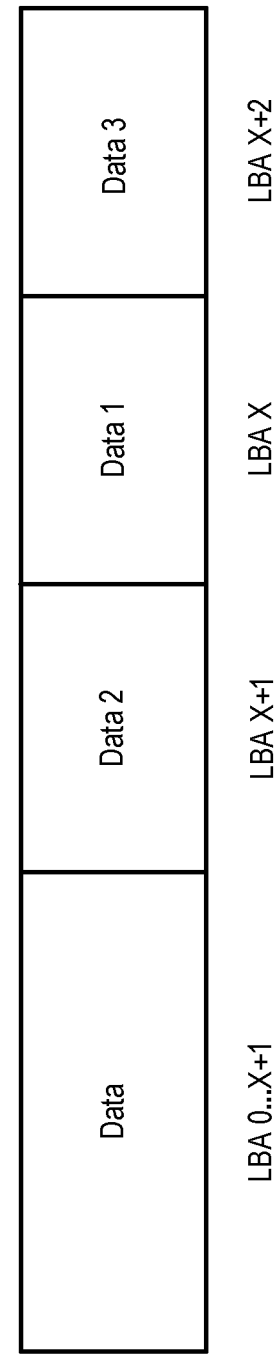
FIG. 9 is an illustration of out-of-order data of an embodiment.

FIG. 9 illustrates an example of this embodiment. In this example, the zone was written sequentially except for LBA X+1 and LBA X. When the host 300 reads LBA 0–X . . . 1, or LBA X+2, the controller 102 (e.g., hardware engine) will have a match between the read LBA and its header. However, when the host 300 reads LBA X+1 or LBA X, the controller 102 will not have a match. In this example, LBA X is mapped to Data 2, which contains LBA X+1 in its header, and LBA X+1 is mapped to Data 1, which contains LBA X in its header. In this situation, the controller 102 can search in the zone for the correct data and return it to the host 300. Since the penalty of the read is high if there is not a match, this embodiment may be desired in situations where it can be assumed that the number of times out-of-order write commands are sent by the host 300 is very small.

There are several alternatives that can be used with these embodiments. For example, in case the zone is not written sequentially, the controller 102 can provide a notification to the host 300 to let it know that it may want to perform a garbage collection operation for that zone. (As mentioned above, one characteristic of a zone is that the host 300 can be in charge of initiating garbage collection.) In another alternative, the controller 102 can re-write the zone in the right LBA order during idle time without any command from the host 300 (so, it would be transparent to the host 300).

There are many advantages associated with these embodiments. For example, these embodiments can allow the host 300 to send commands with a queue depth of greater than one, which can improve performance. As another example, these embodiments can reduce the amount of checks the controller 102 needs to do before responding to a write command, hence reducing latency. Further, these embodiments can allow the controller 102 to support zone storage without new application-specific integrated circuit (ASIC) tape-out.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional (2D) memory structure or a three-dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A data storage device comprising:
   a memory; and
   a controller coupled with the memory and configured to:
      receive, from a host, a write command comprising data and a logical block address in a zone of the memory;
      determine that the logical block address does not match an expected logical block address; and
      in response to determining that the logical block address does not match the expected logical block address:
         write the data to a physical address in the zone of the memory, wherein the data is stored out-of-order with respect to other data stored in the zone of the memory; and
         maintain a logical-to-physical address map for the zone that maps the logical block address to the physical address.

2. The data storage device of claim 1, wherein the controller is further configured to:
   receive a read command comprising the logical block address;
   use the logical-to-physical address map to identify the physical address in the memory that stores the data; and
   read the data from the physical address.

3. The data storage device of claim 1, wherein the expected logical block address is pointed to by a write pointer.

4. The data storage device of claim 1, wherein a queue depth is greater than one.

5. The data storage device of claim 1, wherein the controller is further configured to provide a recommendation to the host to perform garbage collection in response to determining that the logical block address does not match the expected logical block address.

6. The data storage device of claim 1, wherein the controller is further configured to re-write the data in the zone so that the data is not out-of-order with respect to the other data stored in the zone.

7. The data storage device of claim 1, wherein the memory comprises a three-dimensional memory.

8. In a data storage device comprising a non-volatile memory, a method comprising:
   receiving, from a host, a write command comprising data and a logical block address in a zone of the non-volatile memory;
   determining that the logical block address does not match an expected logical block address; and
   in response to determining that the logical block address does not match the expected logical block address:
      writing the data in a temporary buffer;
      creating a logical-to-physical address map that maps the logical block address to a physical address in the non-volatile memory; and
      using the logical-to-physical address map to copy the data from the temporary buffer to the physical address in the non-volatile memory.

9. The method of claim 8, wherein the temporary buffer is part of the non-volatile memory.

10. The method of claim 8, wherein the expected logical block address is pointed to by a write pointer.

11. The method of claim 8, wherein a queue depth is greater than one.

12. The method of claim 8, further comprising
   in response to determining that the logical block address does not match the expected logical block address, providing a recommendation to the host to perform garbage collection.

13. The method of claim 8, further comprising:
   re-writing the data in the zone so that the data is not out-of-order with respect to the other data stored in the zone.

14. A data storage device comprising:
   a memory;
   means for storing, in a zone of the memory, data and a logical block address of the data, wherein the logical block address is stored in a header of the data;
   means for reading the data from the zone of the memory in response to receiving a read command comprising a requested logical block address; and
   means for finding, in the memory, data that corresponds to the requested logical block address in the read command in response to determining that the logical block address read from the zone of the memory does not match the requested logical block address in the read command.

15. The data storage device of claim 14, wherein the data is stored in the memory even if the logical block address of the data does not match an expected logical block address.

16. The data storage device of claim 14, further comprising means for re-writing the data in an expected order in the memory during idle time, wherein the re-writing is transparent to the host.

17. The data storage device of claim 14, further comprising means for providing a recommendation to the host to perform garbage collection in response to determining that the logical block address read from the memory does not match the requested logical block address in the read command.

18. The data storage device of claim 14, wherein the expected logical block address is pointed to by a write pointer.

19. The data storage device of claim 14, wherein a queue depth is greater than one.

20. The data storage device of claim 14, wherein the memory comprises a three-dimensional memory.

* * * * *